United States Patent
Chun et al.

(10) Patent No.: US 9,575,884 B2
(45) Date of Patent: Feb. 21, 2017

(54) SYSTEM AND METHOD FOR HIGH PERFORMANCE AND LOW COST FLASH TRANSLATION LAYER

(71) Applicant: QUALCOMM Incorporated, San Diego, CA (US)

(72) Inventors: Dexter T. Chun, San Diego, CA (US); Anand Srinivasan, San Diego, CA (US); Hyunsuk Shin, San Diego, CA (US); Steven Haehnichen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 13/892,433

(22) Filed: May 13, 2013

(65) Prior Publication Data

US 2014/0337560 A1    Nov. 13, 2014

(51) Int. Cl.
*G06F 12/02* (2006.01)

(52) U.S. Cl.
CPC ... *G06F 12/0246* (2013.01); *G06F 2212/7201* (2013.01); *G06F 2212/7203* (2013.01)

(58) Field of Classification Search
CPC .............. G06F 12/0246; G06F 2212/45; G06F 2212/7201; G06F 2212/7207; G06F 13/28; G06F 3/0679; G06F 21/79; G06F 12/00; G06F 13/1657; G06F 13/36; G06F 12/0866; G06F 13/00; G06F 13/385; G06F 12/1081; G06F 3/0688
See application file for complete search history.

(56) References Cited

U.S. PATENT DOCUMENTS

| | | | |
|---|---|---|---|
| 6,014,724 A * | 1/2000 | Jenett | 711/103 |
| 6,484,218 B1 * | 11/2002 | Pipho | 710/32 |
| 8,041,878 B2 | 10/2011 | Lee | |
| 8,352,690 B2 | 1/2013 | Forhan et al. | |
| 9,122,588 B1 * | 9/2015 | Mondal | G06F 12/0246 |
| 9,213,632 B1 * | 12/2015 | Song | G06F 12/0246 |

(Continued)

FOREIGN PATENT DOCUMENTS

| | | |
|---|---|---|
| EP | 2264602 A1 | 12/2010 |
| TW | 201303587 A | 1/2013 |

OTHER PUBLICATIONS

International Search Report and Written Opinion—PCT/US2014/037531—ISA/EPO—Jul. 29, 2014.
Taiwan Search Report—TW103116876—TIPO—Mar. 25, 2016.

*Primary Examiner* — Michael Krofcheck
(74) *Attorney, Agent, or Firm* — The Marbury Law Group, PLLC

(57) ABSTRACT

Aspects include systems and methods for increasing performance of a flash translation layer (FTL) of a flash memory device. A copy of FTL tables stored on a flash memory device may be copied to a memory of a host device. The copy of the FTL tables may be directly accessed by the flash memory device to translate between logical addresses provided by the host device for read/write operations from/to a flash memory of the flash memory device, and the respective physical addresses of the flash memory. The flash memory device is granted direct memory access to a portion of the memory of the host device where the copy of the FTL tables is stored. The flash memory device bus masters communication busses connecting the flash memory device to the memory of the host device.

56 Claims, 10 Drawing Sheets

(56) References Cited

U.S. PATENT DOCUMENTS

| | | | |
|---|---|---|---|
| 2001/0012222 A1* | 8/2001 | Terasaki | 365/200 |
| 2004/0186946 A1 | 9/2004 | Lee | |
| 2004/0236905 A1* | 11/2004 | Dixon | G06F 12/0866 711/113 |
| 2005/0138464 A1* | 6/2005 | Chong et al. | 714/5 |
| 2008/0183955 A1 | 7/2008 | Yang et al. | |
| 2010/0199024 A1 | 8/2010 | Jeong | |
| 2010/0312947 A1* | 12/2010 | Luukkainen | G06F 12/0223 711/103 |
| 2011/0238892 A1* | 9/2011 | Tsai et al. | 711/103 |
| 2011/0271041 A1 | 11/2011 | Lee et al. | |
| 2011/0296088 A1* | 12/2011 | Duzly | G06F 12/0246 711/103 |
| 2012/0179859 A1 | 7/2012 | Kim et al. | |
| 2013/0080688 A1 | 3/2013 | Park et al. | |
| 2014/0068140 A1* | 3/2014 | Mylly | G06F 12/0873 711/102 |
| 2014/0136765 A1* | 5/2014 | Oh | G11C 16/0483 711/103 |
| 2014/0208004 A1* | 7/2014 | Cohen et al. | 711/103 |

* cited by examiner

SYSTEM AND METHOD FOR HIGH PERFORMANCE AND LOW COST FLASH TRANSLATION LAYER

BACKGROUND

Managed flash storage performance is becoming increasingly demanding. Compact consumer electronics such as smartphones, tablets, and gaming devices require cost effective and low power storage solutions. Examples of managed negated AND or NOT AND (NAND) flash storage devices include embedded MultiMediaCards (eMMC), universal flash storage (UFS), External Serial Advanced Technology Attachment (eSATA), ball grid array (BGA) SATA, Universal Serial Bus (USB) drive, Secure Digital (SD) card, universal subscriber identity module (USIM) card, and compact flash card. NAND devices are popular for mobile applications because they are low cost and low power.

Existing managed NAND flash storage devices rely on large file translation layer (FTL) tables contained within the NAND flash memory, and cache only a small portion of the tables in on-chip static random access memory (SRAM). Read and write accesses to the managed NAND device consist of logical addresses which must be translated to physical NAND addresses using information from the FTL table. This leads to long delays (on the order of tens of microseconds) when reading the FTL table entries from NAND memory, degrading the overall performance of these types of storage. Thus, the penalty for low cost and low power consumption in NAND memory devices is a reduction in memory access time performance.

SUMMARY

The methods and systems of various aspects provide for increasing performance of a flash translation layer (FTL) of a flash memory device including storing a copy of an FTL table of the flash memory device in a volatile memory of a host device by the flash memory device, receiving access to the copy of the FTL table stored in the volatile memory of the host device, by the flash memory device, and accessing the copy of the FTL table of the flash memory device stored in the volatile memory of the host device by the flash memory device as part of at least one of a read operation and a write operation. An aspect method may further include receiving a query for a size of the FTL table from the host device in the flash memory device, returning the size of the FTL table from the flash memory device to the host device, receiving the size of the FTL table from the flash memory device at the host device, and determining, by the host device, whether the volatile memory of the host device can store all of the FTL table. An aspect method may further include subdividing the volatile memory of the host device, by the host device, wherein a size of a subdivision is based on a size of the FTL table, receiving, by the flash memory device, direct memory access read privileges to the subdivision of the volatile memory of the host device where the copy of the FTL table is stored, and receiving, by the flash memory device, direct memory access write privileges for the subdivision of the volatile memory of the host device where the copy of the FTL table, in which storing a copy of the FTL table further includes storing by the flash memory device, the copy of the FTL table in the subdivision of the volatile memory of the host device.

In an aspect, accessing the copy of the FTL table may further include bus mastering, by the flash memory device, a communication bus communicatively connecting the flash memory device and the volatile memory of the host device.

In an aspect, accessing the copy of the FTL table may include receiving in the flash memory device a read operation request for a logical address from the host device, initiating the read operation by the flash memory device, reading at least a portion of the copy of the FTL table by the flash memory device, determining a physical address corresponding to the logical address by the flash memory device, retrieving, by the flash memory device, data located at the physical address of a memory of the flash memory device, and returning the data to the host device by the flash memory device.

In an aspect, accessing the copy of the FTL table may include receiving by the flash memory device a write operation request for a logical address from the host device, initiating the write operation by the flash memory device, writing data to a physical address of a memory of the flash memory device by the flash memory device, writing to the copy of the FTL table, by the flash memory device, to update the copy of the FTL table to correspond with changes made to the memory of the flash memory device when the data was written, and sending a notification of completion of the write operation to the host device by the flash memory device. An aspect method may further include reading at least a portion of the copy of the FTL table by the flash memory device, and determining the physical address corresponding to the logical address by the flash memory device. An aspect method may further include reading an SRAM of the flash memory device by the flash memory device, and determining, by the flash memory device, the physical address indicating a location of free storage space in the memory of the flash memory device. An aspect method may further include sending, by the flash memory device, a notification to the host device indicating completion of storing the copy of the FTL table in the volatile memory of the host device. An aspect method may further include updating, by the flash memory device, the FTL table of the flash memory device with the copy of the FTL based on a parameter selected from a group consisting of a schedule, available resources, and completion of a write operation. An aspect method may further include determining, by the host device, whether the flash memory device supports host caching of a copy of the FTL table in the volatile memory of the host device. An aspect method may further include receiving, in the host device, a notification of the completion of storing the copy of the FTL table from the flash memory device.

An aspect includes a non-transitory processor-readable storage medium having stored thereon processor-executable software instructions configured to cause a system to increase performance of a flash translation layer of a flash memory device of the system by storing a copy of an FTL table of the flash memory device on a volatile memory of a host device by the flash memory device, and receiving access to the copy of the FTL table stored in the volatile memory of the host device, by the flash memory device. The stored instructions may also include instructions for accessing the copy of the FTL table of the flash memory device stored in the volatile memory of the host device by the flash memory device as part of at least one of a read operation and a write operation. The non-transitory processor-readable storage medium may have stored thereon processor-executable software instructions configured to cause a system to perform other operations of the aspect methods described above.

An aspect includes a computing system including a host device having a volatile memory, and a first processor coupled to the volatile memory and a flash memory device in which the system enables increased performance of the flash memory device by storing a copy of a FTL table of the flash memory device in the volatile memory of the host device by the flash memory device; receiving access to the copy of the FTL table stored in the volatile memory of the host device, by the flash memory device, and accessing the copy of the FTL table of the flash memory device stored in the volatile memory of the host device by the flash memory device as part of at least one of a read operation and a write operation.

An aspect includes a system configured to increase performance of a flash translation layer of a flash memory device including means for storing a copy of an FTL table of the flash memory device in a volatile memory of a host device by the flash memory device. The system may also include means for receiving access to the copy of the FTL table stored in the volatile memory of the host device, by the flash memory device, and means for accessing the copy of the FTL table of the flash memory device stored in the volatile memory of the host device by the flash memory device as part of at least one of a read operation and a write operation.

A further aspect includes a flash memory device configured to couple to a host device that includes a flash memory configured to store data including an FTL table for use in translating between a logical address and a physical address, and a processor coupled to the flash memory that is configured with processor-executable instructions to perform operations including storing a copy of a flash translation layer FTL table of the flash memory device in a volatile memory of the host device, receiving access to the copy of the FTL table stored in the volatile memory of the host device, and accessing the copy of the FTL table of the flash memory device stored in the volatile memory of the host device as part of at least one of a read operation and a write operation.

A further aspect includes a device configured to couple to a host device that includes means for storing a copy of an FTL table of the flash memory device in a volatile memory of the host device, means for receiving access to the copy of the FTL table stored in the volatile memory of the host device, and means for accessing the copy of the FTL table of the flash memory device stored in the volatile memory of the host device as part of at least one of a read operation and a write operation.

A further aspect includes a host device configured to couple to a flash memory device that includes a volatile memory, a communication bus communicatively connecting the volatile memory of the host device and configured to communicate to the flash memory device when coupled to the host device, and a processor that is configured with processor-executable instructions to perform operations including determining whether the flash memory device supports host caching of a copy of an FTL table of the flash memory device in the volatile memory, allocating a portion of the volatile memory for storing the copy of the FTL table, and granting the flash memory device direct memory access read and write privileges for the portion of the volatile memory via the communication bus.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
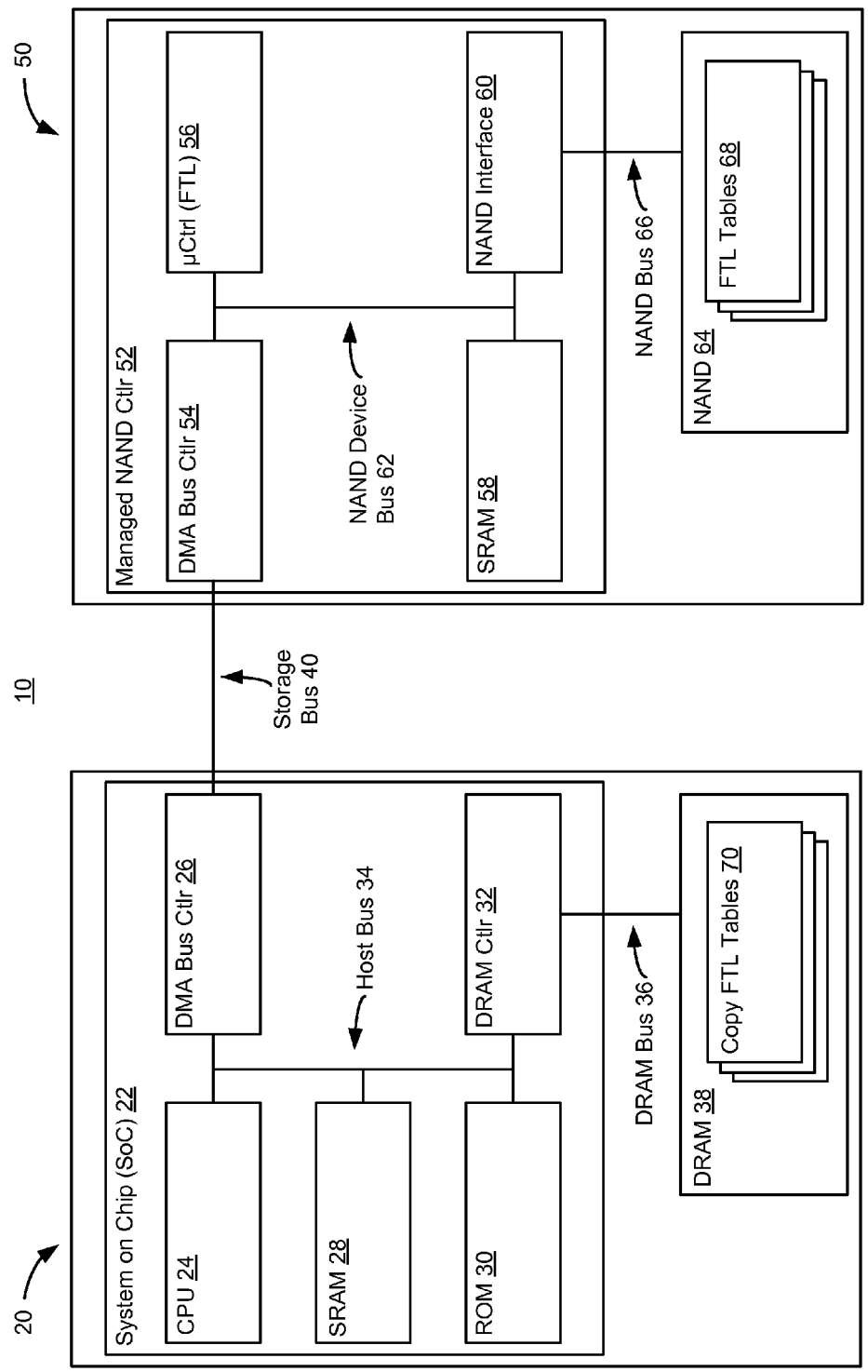
FIG. 1 is a component block diagram illustrating a system having a host device communicatively connected to a flash memory device in accordance with an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor, and operate under battery power such that power conservation methods are of benefit. While the various aspects are particularly useful for mobile computing devices, such as smartphones, which have limited resources and run on battery power, the aspects are generally useful in any electronic device that is compatible for use with a flash memory device.

The term "flash memory" herein refers to an electronic non-volatile computer storage, or memory, that can be electrically erased and reprogrammed. Flash memory device architecture typically includes NAND and NOR types. Aspects herein generally relate to the NAND type architecture of flash memory devices. Flash memory may be used in main memory, memory cards, USB flash drives, solid-state drives, and similar products, for general storage and transfer of data. Examples of NAND flash memory devices include embedded MultiMediaCards (eMMC), universal flash storage (UFS), External Serial Advanced Technology Attachment (eSATA), ball grid array (BGA) SATA, Universal Serial Bus (USB) drive, Secure Digital (SD) card, universal subscriber identity module (USIM) card, and compact flash card.

The terms "flash translation layer" and "FTL" herein refer to a directory structure created to allow a controller of a flash memory device to convert requests for logical addresses into the physical addresses in the actual flash memory chips. The directory structure may comprise any of various data structures. For purposes of example, herein the FTL will be described as being in the form of tables.

One technique for increasing translation performance in memories adds a dedicated dynamic random access memory (DRAM) into the solid state drive (SSD), or hard disk drive (HDD) that is used to cache the entire translation table. Since DRAM can be accessed with approximately three (3) orders of magnitude greater speed than NAND flash memory or hard disk drive memory, this can provide a significant performance boost. However, adding a DRAM to the chip increases the cost and consumes significant standby power because the extra DRAM must be self refreshed to retain contents. Some laptop computer SSDs employ this type of mechanism to cache the translation table since such computers are typically not power limited and consumers expect to pay more for such devices. However, the increase in costs and added power drain of NAND flash memories with embedded DRAM memory are significant disadvantages for mobile computing devices, such as smartphones.

The various aspects include methods, systems, and devices configured to improve the performance of flash memory device operations while minimizing the cost and power drain of such by using the DRAM memory of a host device to store the translation table for the flash memory. This may be achieved through a system including the host device in communication with the flash memory device in which the host device and flash memory are configured so that the flash memory device can use the faster memory resources of the host device to cache the translation tables that the flash memory device uses to translate between logical and physical memory addresses.

In an aspect the host device may grant the flash memory device direct memory access to its faster memory resources. Direct memory access may include read and/or write privileges for the faster memory resources. The flash memory device may use such direct access permissions to store a copy of the FTL tables in the faster memory resources of the host device. In allowing the storage of the copy of the FTL tables, the host device may subdivide its faster memory resources to provide a specific area of suitable size to contain the copy of the FTL tables. Thus, the size of the memory subdivision may be based on the size of the FTL tables.

In another aspect, the direct memory access may be limited in order to protect the host device from security issues stemming from the direct memory access permissions granted to the flash memory device. For example, the direct memory access may only be granted for the area of the faster memory resources designated for the copy of the FTL tables. Further security measure may also be enacted, such as key comparisons. It is also conceived that such security measures taken to protect the host device and other security measures may be applied to protect the flash memory device as well. Implementing security measures for the flash memory device may prevent the host device from corrupting the FTL tables.

When read and/or write operations for the flash memory device are requested by the host device, the read and/or write operation request may include logical addresses for where to read data from and/or write data to the flash memory device. To execute the read and/or write requests the flash memory device may translate the logical address to a physical address of its own memory using the FTL tables. To do so, the flash memory device may use its direct memory access permissions to retrieve address mapping information from the copy of the FTL tables relating to the specified logical addresses in order to translate it to a corresponding physical address.

The direct memory access may also allow the flash memory device to write to the copy of the FTL tables. In completing a write request from the host device, the flash memory device alters its own memory contents, including the physical addresses into which data was written. To reflect the changes in its memory, the flash memory device may update the FTL tables stored in the host device to reflect the current physical addresses. The updates allow the information written to memory to be accessed later and indicate that the space where the information was written is not free space.

In another aspect, the flash memory device may direct memory access to update the FTL tables stored in its own memory based on the FTL tables stored in the host device's fast memory resources. When the copy of the FTL table is updated to reflect changes in the flash memory device, the FTL tables in the flash memory device may not be similarly updated at the same time. Delaying updating of the FTL tables stored in the flash memory may enable conserving power resources, especially when the host device is performing frequent memory writing operations. To make sure the records of the changes to the flash memory device are reflected in non-volatile copy of the FTL tables stored in the flash memory device, those FTL tables may be periodically updated from the FTL tables stored in the host device's fast memory resources. To do so, the flash memory device may retrieve the copy of the FTL tables from the FTL tables stored in the host device's fast memory resources (or the changes made to the copy of the FTL tables since the last update), and store the copy of the FTL table in flash memory, effectively overwriting its own FTL tables (or the changed portions thereof). In such processes, the flash memory device may replace its FTL tables with the copy of the FTL tables, compare the two versions of the FTL tables to determine the differences and write the differences to its FTL tables, or write the changes in the copy of FTL tables to its FTL tables. The update may also be executed at a time and/or in a manner to reduce or minimize impact on the system resources, such as memory accesses or battery power.

In an aspect the host device and the flash memory device may be connected such that communication between the devices is transmitted over a communication bus. To directly access the host device's fast memory resources the flash memory device may be enabled to function as the bus master controlling the communication bus connecting it to the faster memory resources. In other words, the flash memory device and the communication bus may be configured to allow the flash memory device to initiate communication transactions over the communication bus. Various aspects may have different communication bus configurations to provide bus mastering capabilities for the host device and the flash memory device. For example, dedicated communication busses for each device may allow only one device to function as the bus master for each communication bus. As another example, the communication bus configuration may conform to bus standards that support multiple device bus mastering, such as PCI Express (PCIe) or a low latency interface (LLI).

The various aspects may be implemented within a variety of systems, such as the example FTL host caching system 10 illustrated in FIG. 1. The FTL host caching system 10 may include a processor 24, 52, a memory or storage unit 28, 30, 38, 58, 64, a communication controller 26, 32, 54, a memory interface 60, and a communication link 34, 36, 40, 62, 66. In an aspect the processor may be a central processing unit (CPU) 24 or a microcontroller (μCtrl) 56. Other aspects may replace the CPU 24 and microcontroller 56 with an alternative processor, or may include additional processors. Such other processors may include, for example, one or more other CPUs or microcontrollers, a microprocessor, a graphics processing unit (GPU), an accelerated processing unit (APU), a physics processing unit (PPU).

The memory or storage units 28, 30, 38, 58, 64, may include any of a wide array of volatile and non-volatile types of memory. In an aspect the FTL host caching system 10 may include an SRAM 28, 58, a ROM 30, a DRAM 38, and a flash memory 64. Other types of memory may include magnetic, optical, or hybrid memory devices. Moreover, FTL tables 68 may be stored in the flash memory 64, and when created, a copy of FTL tables 70 may be stored on DRAM 38.

The communication controllers 26, 32, 54, 60, may be configured to manage communication between multiple components of the FTL host caching system 10. Each communication controller 26, 32, 54, may specifically manage communication between a specific component and the other components. For example, a direct memory access (DMA) bus controller 26 may be configured to manage communications between the CPU 24 and the DRAM 38, on one side of the DMA bus controller 26, and the microcontroller 56 on the other side. Similarly a DMA bus controller 54 may manage communication between the microcontroller 56, on one side of the DMA bus controller 54, and the CPU 24 on the other side. The DMA bus controller could be configured to manage address and data communications between the flash memory 64 and the CPU 24, if the CPU 24 was granted direct memory access to the flash memory 64. A DRAM controller 32 may be configured to manage communication between the DRAM 38 on one side, and the CPU 24 and the microcontroller 54 on the other side.

The memory interface 60 may be configured as a flash memory interface 60. In an aspect, the flash memory interface 60 may be specifically configured for a NAND or NOR flash memory architecture. In an aspect, the flash memory interface 60 may be configured for a NAND architecture in which the flash memory interface 60 provides read and write access to the flash memory 64 on a page addressing basis.

The communication links 34, 36, 40, 62, 66, may provide a path for address and data communications between the various components of the FTL host caching system 10. In various aspects, the communication links 34, 36, 40, 62, 66 may be configured for internal communication between components of a single device, or external communication between a main device and a peripheral device. A host bus may provide the communication path between, for example, the CPU 24, the DMA bus controller 26, the SRAM 28, the ROM 30, and the DRAM controller 32. A DRAM bus 36 may provide the communication path between the DRAM 36 and other components, like the DRAM controller 32. A storage bus 40 may provide the communication path between the DMA bus controllers 26, 54. A flash memory device bus 62 may provide the communication path between the DMA bus controller 54, the microcontroller 56, the SRAM 58, and the flash memory interface 60. A flash memory bus 66 may provide the communication path between the flash memory 64 and other components, like the flash memory interface 60.

In some aspects, the combination of some or all of these components forms a host device 20 and a flash memory device 50. In various aspects the host device 20 and flash memory device 50 may be configured as separately housed devices with the ability to communicate over communication link 40. For the sake of example, which is not meant to be limiting, the host device 20 may be composed of the CPU 24, DMA bus controller 26, the SRAM 28, the ROM 30, the DRAM controller 32, the host bus 34, the DRAM bus 36, the DRAM 38, and a portion or all of the storage bus 40. Continuing this example, the flash memory device 50 may be composed of a portion or all of the storage bus 40, the DMA bus controller 54, the microcontroller 56, the SRAM 58, the flash memory interface 60, the flash memory device bus 62, the flash memory 64, and the flash memory bus 66.

In an aspect of the host device 20, the components may further be combined into an integrated circuit, such as a system on chip (SoC) 22. Components of the SoC 22 may include the CPU 24, DMA bus controller 26, the SRAM 28, the ROM 30, the DRAM controller 32, the host bus 34, and a portion or all of the DRAM bus 36 and the storage bus 40. Similarly, the flash memory device 50 may further include a combination of components into an integrated circuit, such as a managed flash memory controller 52. Components of the managed flash memory controller 52 may include a portion or all of the storage bus 40 and the flash memory bus 66, the DMA bus controller 54, the microcontroller 56, the SRAM 58, the flash memory interface 60, and the flash memory device bus 62.

Figure 2:
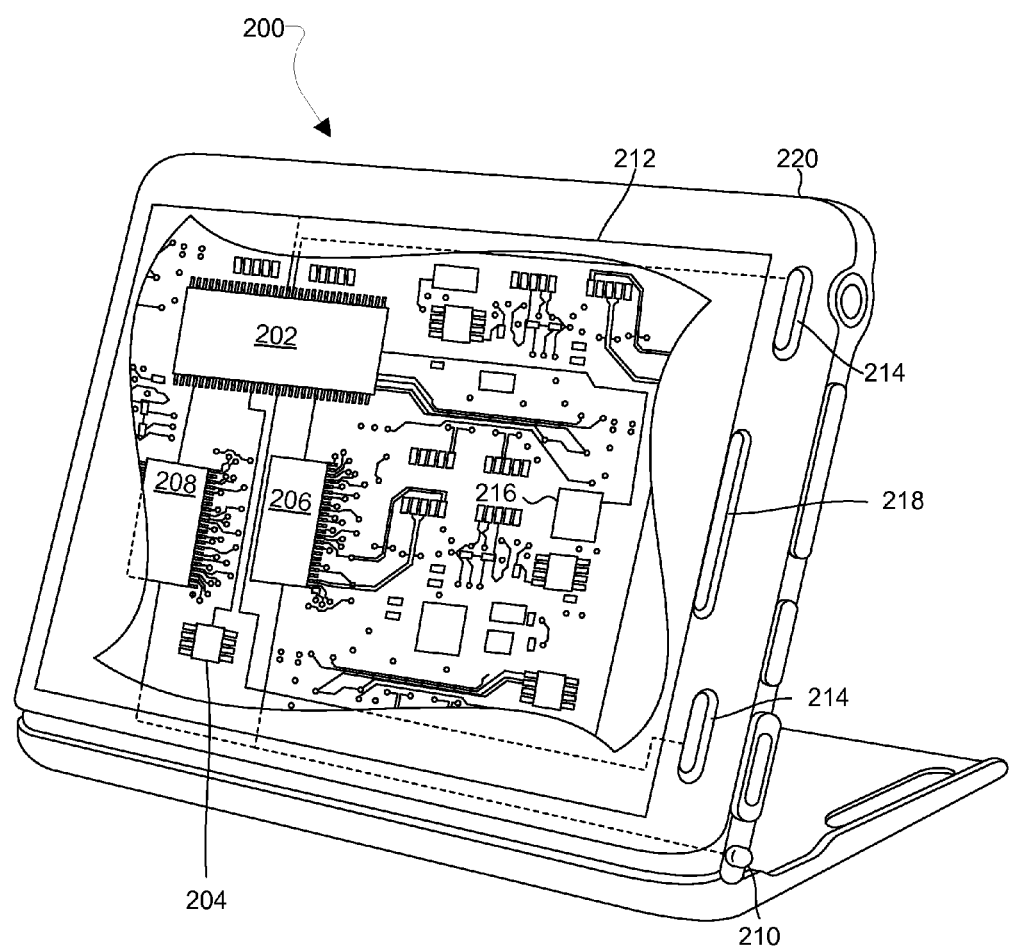
FIG. 2 is a component diagram of an example mobile device suitable for use with the various aspects.
Figure 3:
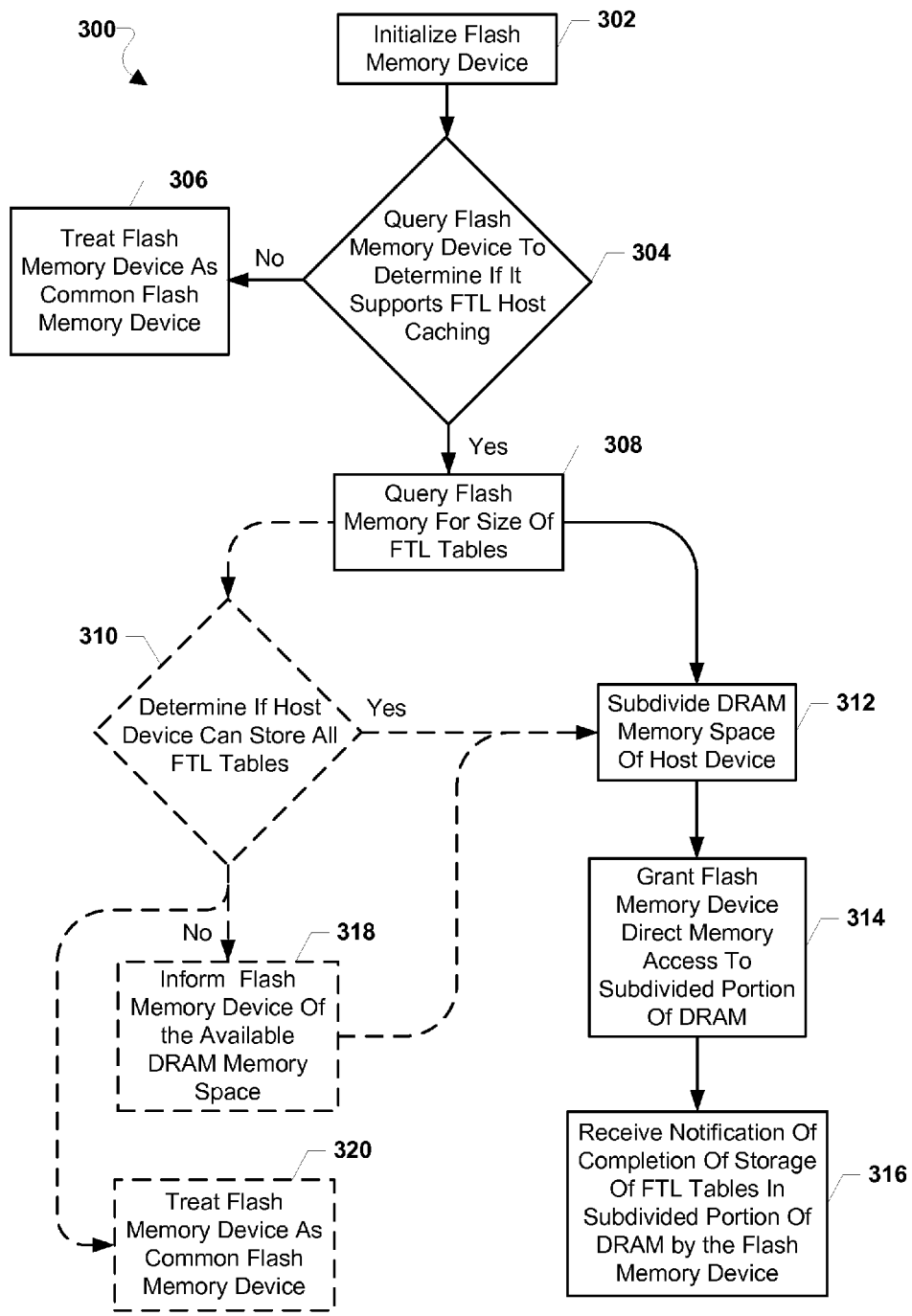
FIG. 3 is a process flow diagram illustrating an aspect method for initializing FTL host caching.

FIG. 2 illustrates an example mobile device 200 suitable for use in the FTL host caching system 10. In various aspects, the mobile device 200 may include a processor 202 coupled to a touchscreen controller 204 and an internal memory 206. The internal memory 206 may be volatile or non-volatile memory, and may also be secure and/or encrypted memory, or unsecure and/or unencrypted memory, or any combination thereof. The touchscreen controller 204 and the processor 202 may also be coupled to a touchscreen panel 212, such as a resistive-sensing touchscreen, capacitive-sensing touchscreen infrared sensing touchscreen, etc. The mobile device 200 may have one or more radio signal transceivers 208 (e.g., Peanut®, Bluetooth®, Zigbee®, Wi-Fi, RF radio) and antennae 210 for sending and receiving. The transceivers 208 and antennae 210 may be used with the above-mentioned circuitry to implement the various wireless transmission protocol stacks and interfaces. The mobile device 200 may include a cellular network wireless modem chip 216 that enables communication via a cellular network. The mobile device 200 may include peripheral device connection port 218 coupled to the processor 202 and configured to connect to the flash memory device 50. The peripheral device connection port 218 may be singularly configured to accept one type of connection, or multiply configured to accept various types of physical and communication connections, such as USB, FireWire, Thunderbolt, or PCIe. The mobile device 200 may also include speakers 214 for providing audio outputs. The mobile device 200 may also include a housing 220, constructed of a plastic, metal, or a combination of materials, for containing all or some of the components discussed herein.

The various aspects of caching the FTL tables in the host device's fast memory resources may involve executing an FTL host cache initialization method 300, an aspect of which is illustrated in FIG. 3, by the FTL host caching system 10. The FTL host cache initialization method 300 may be initiated by the host device 20. To begin the method 300, the host device 20 may initialize the flash memory device 50, in block 302, by either a commonly used or proprietary process. Either once completed or during the initialization of the memory device 50, the host device 20 may query the flash memory device 50 to determine whether the flash memory device 50 supports FTL host caching in determination block 304. When the flash memory device 50 does not support FTL host caching (i.e. determination block 304="No"), the host device 20 will treat the flash memory device 50 as a common flash memory device in block 306.

If the host device 20 determines that the flash memory device 50 support FTL host caching (i.e. determination block 304="Yes"), the host device 22 may query the flash memory device 50 for a size of the FTL tables 68 in block 308. Once the host device is informed of the size of the FTL tables 68, in block 312 the host device 20 may subdivide its DRAM 38, setting aside sufficient space to store and modify the copy of the FTL tables 70. In block 314, the host device 20 may grant direct memory access, including read and/or write privileges, to the flash memory device 50 for the portion of the DRAM 38 subdivided and set aside for the copy of the FTL tables 70. Once the copy of the FTL tables 70 is stored in the DRAM 38, the host device 20 may receive a notification that the copying of the FTL tables 68 is complete in block 316.

If the host device 20 determines that the flash memory device 50 supports FTL host caching (i.e. determination block 304="Yes"), the host device 20 may determine whether it can store all of the FTL tables 68 within its own DRAM 38 in determination block 310. If the host device 20 can store all of the FTL tables 68 within its own DRAM 38 (i.e. determination block 310="Yes"), the host device 20 may subdivide its DRAM 38 in block 312, grant direct memory access to the flash memory device 50 in block 314, and receive a notification that the copying of the FTL tables 68 is complete in block 316 (as described herein).

If the host device 20 cannot store all of the FTL tables 68 within its own DRAM 38 (i.e. determination block 310="No"), the host device 20 may inform the flash memory device 50 of the amount of space available in the DRAM 38 in block 318, and continue with the operations described above with reference to block 312. If the host device 20 cannot store all of the FTL tables 68 (i.e. determination block 310="No"), in block 320 the host device 20 may treat the flash memory device 50 as a common flash memory device, or one that does not support FTL host caching.

Alternative aspects of the FTL host cache initialization method 300 may include the flash memory device 50 initializing FTL host caching and querying the host device 20 to determine whether the host device 20 supports FTL host caching. In such an aspect, upon booting and prior to executing the FTL host cache initialization method 300, the host device 20 may set aside a subdivision of its DRAM 38 in anticipation of FTL host caching. When the flash memory device 50 is connected to the host device 20 the FTL host cache initialization method 300 may commence, at which point the flash memory device 50 may query the host device 20 to determine whether the host device 20 supports FTL host caching. If the host device 20 does not support FTL host caching, the flash memory device 50 may treat the host device 20 as a common host device. If the host does support FTL host caching, the remaining operation (e.g., blocks 308-320) of the FTL host cache initialization method 300 may be executed.

Figure 4:
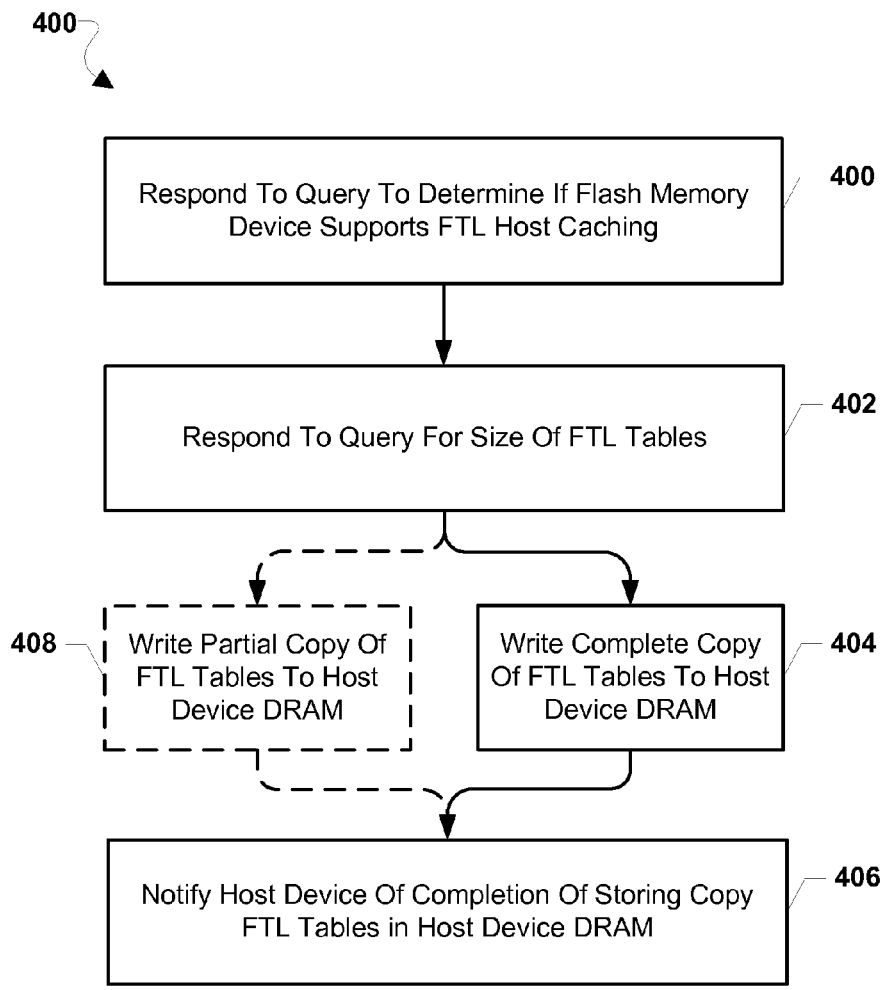
FIG. 4 is a process flow diagram illustrating an aspect method for initializing FTL host caching.

The various aspects of the FTL host caching initialization method 300 may include further operations as illustrated in FIG. 4. Such operations may occur concurrently, in an appropriate order, with the operations illustrated in FIG. 3. Once initialized by the host device 20, in block 400 the flash memory device 50 may respond to the query from the host device 20 to determine if the flash memory device 50 supports FTL host caching. Aspects of the FTL host caching initialization method 300 may include the response to this query to be either passive or active. For example, if the response is passive, the host device 20 may read a value in a specific register or memory location of the flash memory device 50 to determine support of FTL host caching. An active response, for example, may include the flash memory device 50 sending a specific signal to the host device 20 indicating whether or not the flash memory device 50 supports FTL host caching. In an active response aspect, a lack of response may also be an indication of whether or not the flash memory device 20 supports FTL host caching.

If the flash memory device 50 is FTL host caching compatible, in block 402 it may respond to the query from the host device 20 for the size of the FTL tables 68. The response may involve returning a value indicating the amount of memory necessary to store a copy of the entirety of the FTL tables. Much like the response to the query to determine FTL host caching compatibility in block 400, the various aspects of this response in block 402 may include active and passive responses. If the host device 20 has granted the flash memory device 50 direct memory access permissions, in block 404 the flash memory device 50 may write the complete copy of the FTL tables 70 to the DRAM 38 of the host device 20. Alternatively, if the host device 20 determines that it cannot store all of the FTL tables 68, the flash memory device 50 may write a partial copy of the FTL tables 70 to the DRAM 38 in block 408 after having been granted flash memory device 50 direct memory access permissions. Once this operation is complete, in block 406 the flash memory device 50 may send a notification to the host device 20 indicating that the copy of the FTL tables 70 are stored in the DRAM 38 of the host device 20.

Figure 5:
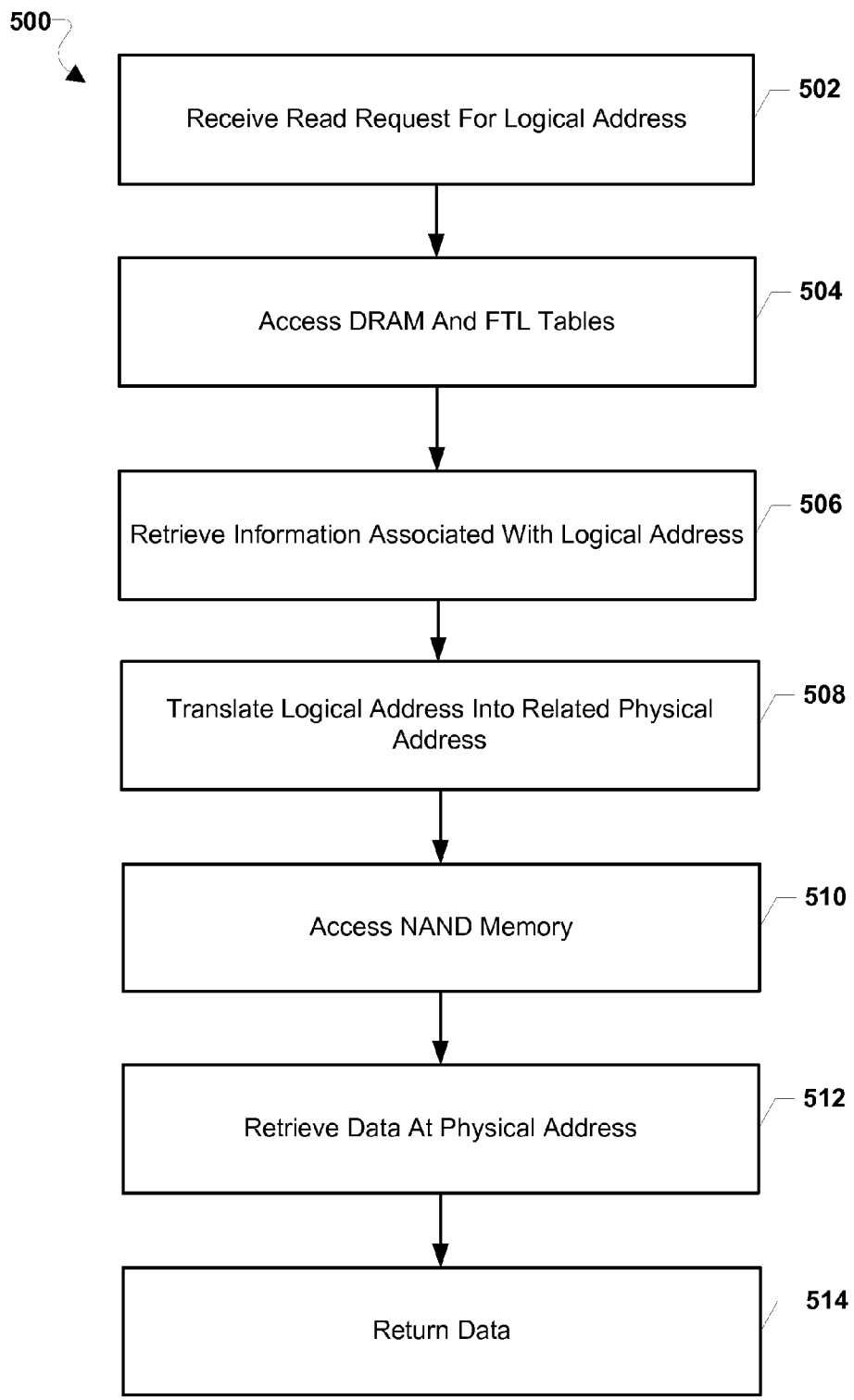
FIG. 5 is a process flow diagram illustrating an aspect method for executing a read operation with FTL host caching.

To aid in read and/or write operations from and/or to the flash memory 64, various aspects of FTL host caching may include the flash memory device 50 reading from and/or writing to the copy of the FTL tables 70 stored in the DRAM 38 of the host device 20. In an aspect, a read from the flash memory device 50 operation 500 may be implemented, as illustrated in FIG. 5. In block 502, the flash memory device 50 may receive a read request, from the host device 20, associated with a logical address of the flash memory 64. Having been informed of the requested operation and logical address, the flash memory device 50 may initiate the write operation. In block 504 the flash memory device 50 may directly access the copy of the FTL tables 70 located in the DRAM 38 of the host device 20. In an aspect of the read operation 500, the permissions granted to the flash memory device 50 for direct memory access to the DRAM 38 may allow the flash memory device 50 to bus master, or issue commands over, the storage bus 40 connecting the devices 20, 50. Once directly accessing the DRAM 38 of the host device 20, in block 506 the flash memory device 50 may read/retrieve information from the copy of the FTL tables 70 associated with the logical address.

Having retrieved the necessary information from the copy of the FTL tables 70, in block 508 the flash memory device 50 may translate the logical address to the physical address of the flash memory 64. In block 510, the flash memory device 50 may access the flash memory 64, and retrieve/read the data located at the physical address in block 512. After retrieving the data from its flash memory 64, in block 514 the flash memory device 50 may return the data to the host device 20 to complete the read request.

Figure 6:
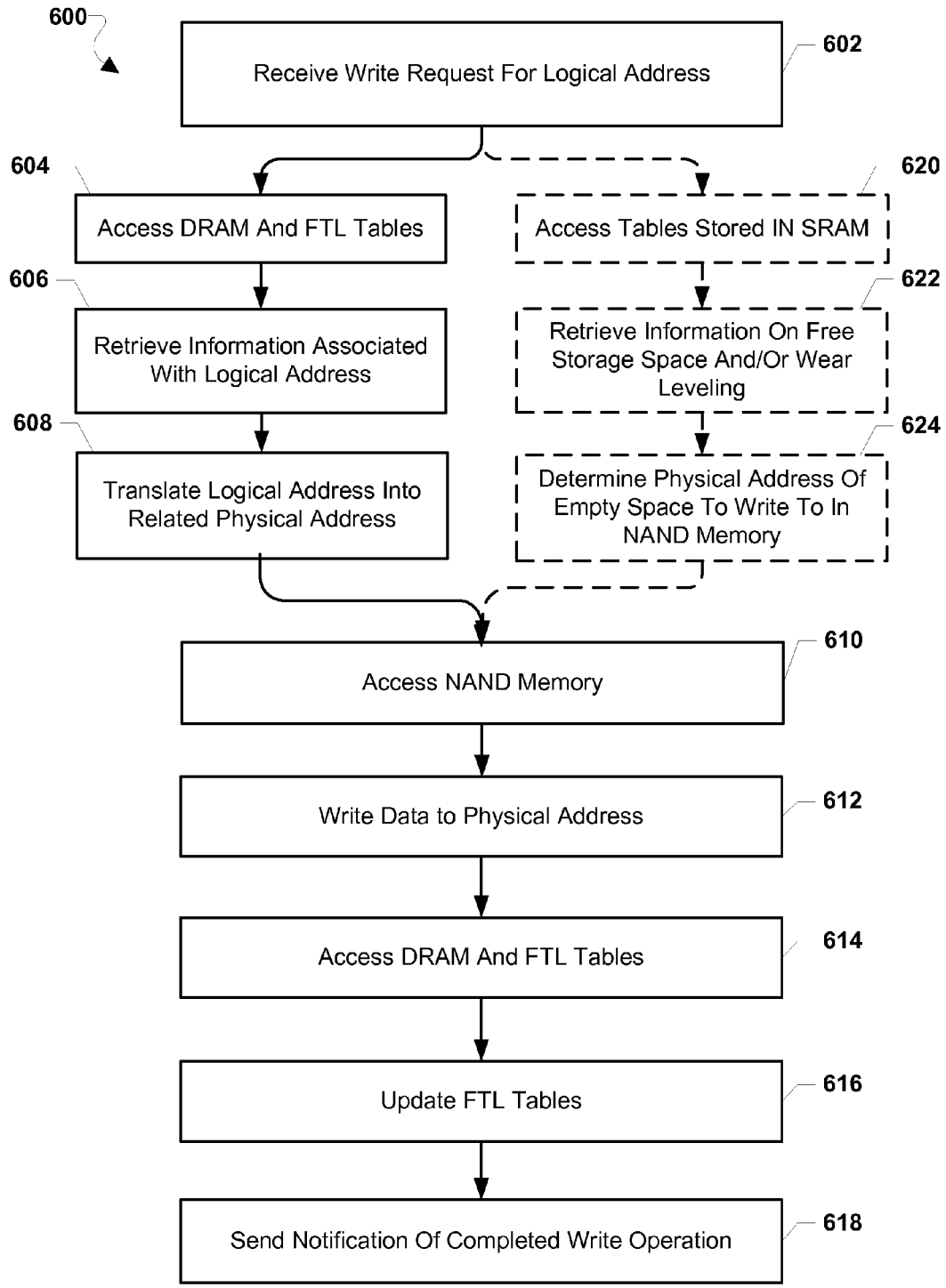
FIG. 6 is a process flow diagram illustrating an aspect method for executing a write operation with FTL host caching.

In another aspect, FIG. 6 illustrates a write to the flash memory device 50 operation 600 may be implemented. In block 602, the flash memory device 50 may receive a write request, from the host device 20, associated with a logical address of the flash memory 64. Informed of the requested operation and logical address, the flash memory device 50 may initiate the write operation. In block 604 the flash memory device 50 may now directly access the copy of the FTL tables 70 located in the DRAM 38 of the host device 20. In an aspect of the write operation 500, the permissions granted to the flash memory device 50 for direct memory access to the DRAM 38 may allow the flash memory device 50 to bus master, or issue commands over, the storage bus 40 connecting the devices 20, 50. Once directly accessing the DRAM 38 of the host device 20, in block 606 the flash memory device 50 may read/retrieve information from the copy of the FTL tables 70 associated with the logical address.

Having retrieved the necessary information from the copy of the FTL tables 70, in block 608 the flash memory device 50 may translate the logical address to the physical address of the flash memory 64. In block 610, the flash memory device 50 may access the flash memory 64, and write a data associated with the write request to the physical address of the flash memory 64 in block 612. When the data is stored in the flash memory 64, in block 614 the flash memory device 50 may again directly access the copy of the FTL tables 70 located in the DRAM 38 of the host device 20. In block 616, the flash memory device 50 may update the copy of the FTL tables 70 to reflect the changes in the physical addresses used to store the data of the write request. Once the data has been written to the flash memory 64 and the copy of the FTL tables 70 has be updated, in block 618 the flash memory device 50 may send a notification that the write to the flash memory device 50 operation 600 has been completed.

In an alternative aspect of the write to the flash memory device 50 operation 600, it may not be necessary to write to specific logical and physical addresses. Rather, it may be sufficient to know where there is empty space to write the data, and maybe if the space is in good condition for storing the data. So, after receiving a write request from the host device 20 in block 602, which in varying aspects may or may not provide a logical address, in block 620 the flash storage device 50 may access tables stored in its SRAM 58. These tables in SRAM 58 may contain information that may indicate the location of free storage space, or blocks, in the flash memory 64 and wear leveling information for the flash memory 64. In block 622, the flash storage device 50 may retrieve from the tables in the SRAM 58 free storage space and/or wear leveling information relating to the flash memory 64 for space suitable for storing the data. With this information, in block 624 the flash storage device 50 may determine the physical address of where to write the data to the memory, access the flash memory 64 in block 610, and continue with the remainder of the write to the flash memory device 50 operation 600 as described herein.

Other aspects may include updating the FTL tables 68 to reflect the changes that have been made to the copy of the FTL tables 70. One such aspect may include updating the FTL tables 68 as part of or after the write to the flash memory device 50 operation 600. For example, in block 616 the FTL tables 68 may be updated at any point after updating the copy of the FTL tables 70. Such an update may include copying the copy of the FTL tables 70 or copying just the updates to the copy of the FTL tables 70 to the flash memory 64. It is also conceived that the updates to the FTL tables 68 may occur before or concurrently with the updates to the copy of the FTL tables. Further aspects may include updating the FTL tables 68 by a predefined rule or dynamically based on available resources. For example, the predefined rule may execute an update of the FTL tables 68 periodically, based on a schedule, available resources, in response to a command, or based on a set of parameters. Updating the FTL tables 68 dynamically, for example, may occur based on a determination by either or both devices 20, 50, of the available resources, power, and/or time needed to execute the update with the lowest cost on the performance of the FTL host caching system 10. Such times may be when the FTL host caching system 10 is idle or minimal processes are running.

Figure 7:
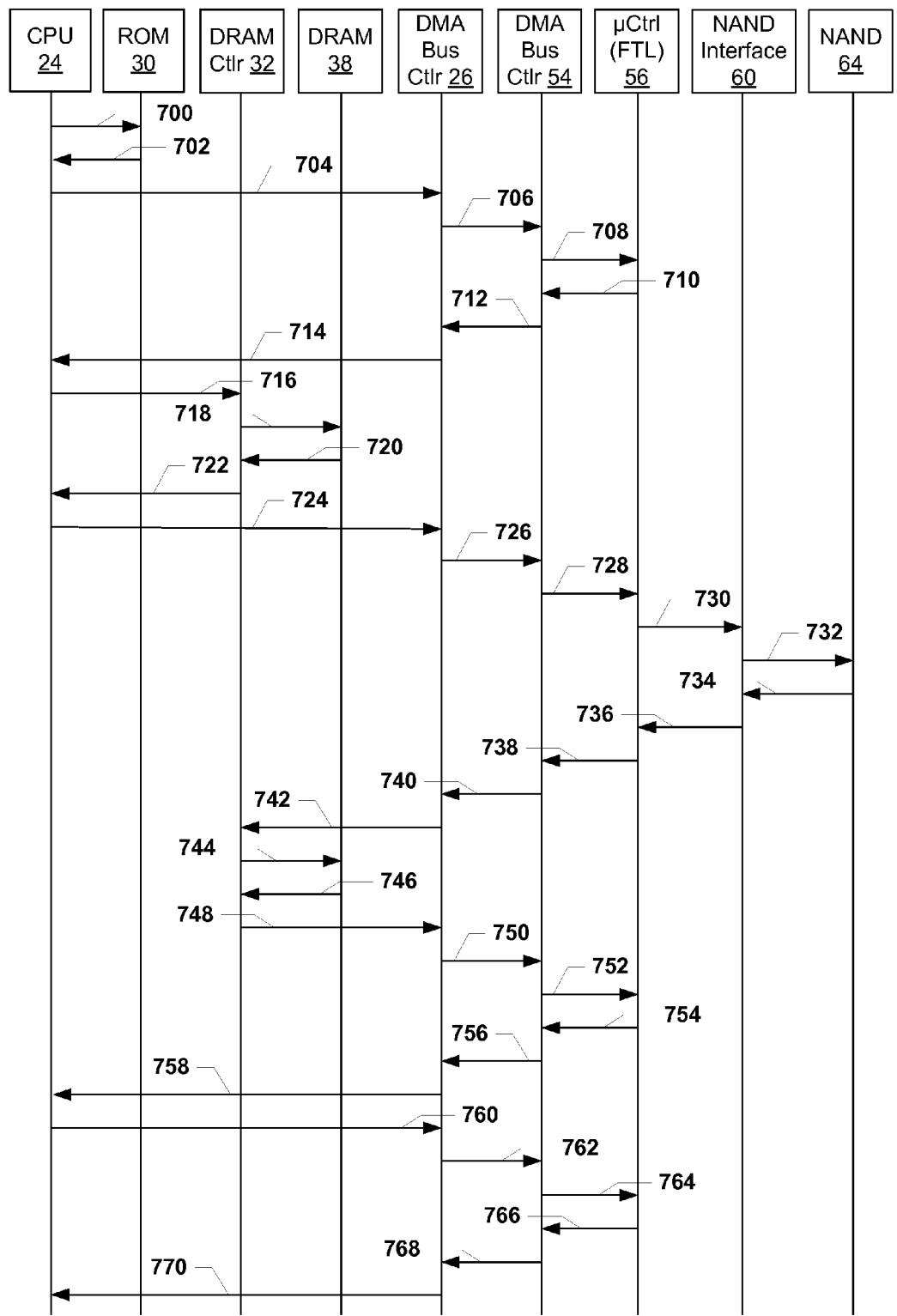
FIG. 7 is a process flow diagram illustrating an aspect method for initializing FTL host caching.

FIG. 7 illustrates an aspect of the process flow of the FTL host caching initialization method 300 during a boot sequence of the host device 20. Aspects are conceived where the FTL host caching initialization method 300 is executed at times other than during a boot sequence of the host device 20. For example, upon a connection of the flash memory device 50 while the host device 20 is running. In FIG. 7, the CPU 24 of the host device 50 sends signal 700 to access boot information in the ROM 30 of the host device 50, such as BIOS and drivers, and to execute code processes of the initialization method 300. The CPU 24 may receive the information and the code processes via a return signal 702 from the ROM 30. The CPU 24 may check for and initialize connected peripheral devices, like the flash memory device 50, and query for FTL host caching compatibility, and the size of the FTL tables 58. To do so, the CPU 24 sends signal 704 to the DMA bus controller 26 of the host device 50, which may be forwarded as signal 706 to the DMA bus controller 54 of the flash memory device 50. The signal 706 may be forwarded to the microcontroller 56 of the flash memory device 50 as signal 708. In some aspects the microcontroller 56 may respond to the query of the CPU 24 by sending a response signal 710 back to the CPU 24 via the DMA bus controller 54, forwarding signal 710 as signal 712 to the DMA bus controller and as signal 714 to the CPU 24.

Being informed of the size of the FTL tables 58, the CPU 24 may send a signal 716 to check the DRAM 38 of the host device 20 to determine whether it is capable of storing all of the FTL tables 58 and the CPU 24 may subdivide and set aside a portion of the DRAM 38 for the FTL tables 58. Signal 716 may be received by the DRAM controller 32 and interpreted into signal 718 sent to the DRAM 38. The DRAM controller 32 may receive a return signal 720 from the DRAM 38, and send return a signal 722 to the CPU 24 to complete these portions of the operation.

The CPU 24 may provide the microcontroller 56 direct memory access to the DRAM 38 and request the copy of the FTL tables 70 by sending a signal 724 to DMA bus controller 26. Signal 724 may be forwarded to the DMA bus controller 54 as signal 726 and to the microcontroller 56 as signal 728. The microcontroller 56 may send signal 730 to access the FTL tables 58 in the flash memory 64 and retrieve the copy of the FTL tables 70. The memory interface 60 receives signal 730 and interprets it as signal 732, which is sent to the flash memory 64. The memory interface 60 receives a return signal 734 from the memory 64 representing the copy of the FTL tables 70, and forwards signal 734 as signal 736 to the microcontroller 56.

Having been granted direct memory access to the DRAM 38, the microcontroller 56 may bus master the busses 34, 40, connecting it to the DRAM 38. The microcontroller 56 may send a signal 738 to write the copy of the FTL tables 70 to the DRAM 38. The signal 738 is forwarded by DMA controller 54, as signal 740, to the DMA controller 26, which forwards signal 742 to the DRAM controller 32. Signal 742 is interpreted as signal 744 and sent to the DRAM 38. The DRAM controller 32 may identify when the copy of the FTL tables 70 are stored in the DRAM 38 by receiving signal 746, and send signal 748 to the microcontroller 56 to indicate the writing is complete. The DMA bus controller 26 may receive signal 748 and forward it as signal 750, which may be received by DMA bus controller 54 and forwarded to the microcontroller 56 as signal 752.

Once the copy of the FTL tables 70 are written to the DRAM 38, the microcontroller 56 may signal to the CPU 24 that the FTL host caching initialization method 300 is complete by sending signal 754. The DMA bus controller 54 may receive signal 754 and forward it as signal 756 to the DMA bus controller 16, which may forward signal 758 to the CPU 24.

Figure 8:
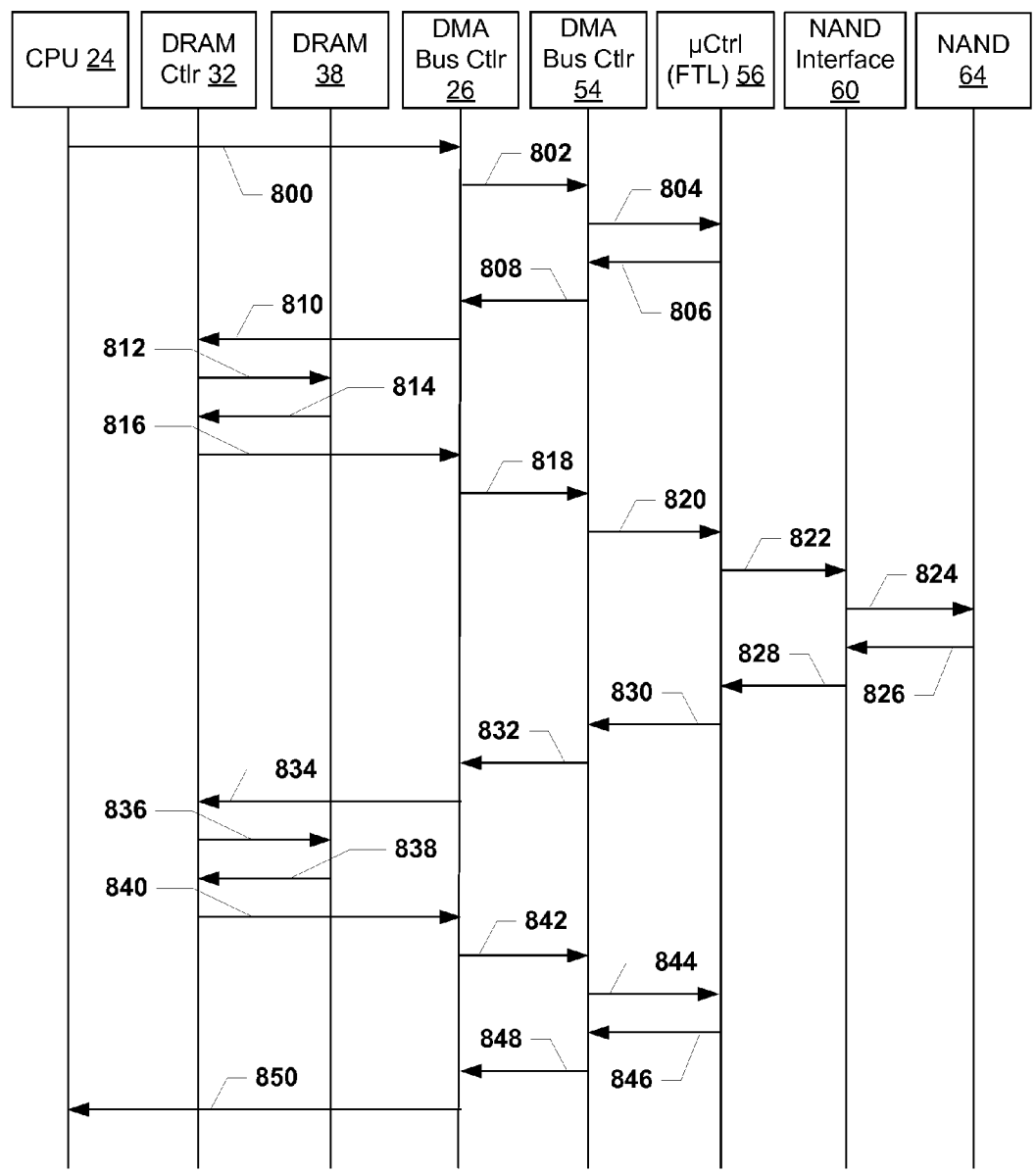
FIG. 8 is a process flow diagram illustrating an aspect method for executing a read operation with FTL host caching.

The CPU 24 may acknowledge the completion of the FTL host cashing initialization method 300 and instruct or give permission to the microcontroller to begin using the copy of the FTL tables 70 in the DRAM 38 for read and write operations by sending signal 760. The DMA bus controller 26 may receive the signal 760 and forward it to the DMA bus controller 54 as signal 762, which may be relayed from the DMA bus controller 54 to the microcontroller 56 as signal 764. The microcontroller 56 may return an acknowledgement of the permission from the CPU 24 as signal 766. The DMA bus controller 54 may receive the signal 766 and forward it to the DMA bus controller 26 as signal 768, and to the CPU 24 as signal 780 from the DMA bus controller 26. FIG. 8 illustrates an aspect of the process flow of the read from the flash memory device 50 operation 500. The CPU 24 may issue the read request for the logical address to the microcontroller 56, sending the signal 800 carrying the request through the DMA bus controller 26 as signal 802. The DMA controller 54 may receive signal 802 and forward it to the microcontroller 56 as signal 804.

Having been granted direct memory access to the DRAM 38 during the FTL host caching initialization, the microcontroller 56 may bus master the busses 34, 40 connecting it to the DRAM 38. The microcontroller may send signal 806 to retrieve/read the information associated with the logical address in the copy of the FTL tables 70 from the DRAM 38. The DMA bus controller 54 may forward signal 806 to the DMA bus controller 26 as signal 808, which may be forwarded to the DRAM controller 32 as signal 810. The DRAM controller 32 may interpret signal 810 and send signal 812 to the DRAM 38. The DRAM controller 32 may receive a return signal 814 from the DRAM 38, which may be sent to the DMA bus controller 26 as signal 816, forwarded to DMA bus controller 54 as signal 818, and finally received by the microcontroller 56 as signal 820. With the information retrieved from the copy of the FTL tables 70, the microcontroller 56 may now translate the logical address to the physical address of the flash memory 64.

Having determined the physical address, the microcontroller 56 may access the memory 64 and retrieve/read data located at the physical address by sending signal 822. The memory interface 60 may interpret the signal 822 and send signal 824 to the memory 64. A return signal 826 from the memory 64 representing the information at the physical address may be received by the memory interface 60 and sent to the microcontroller 56 as signal 828. The microcontroller 56 may forward the retrieved data to the DRAM 38 for use by the CPU 24 by sending signal 830. The DMA bus controller 54 may receive signal 830 and forward it to the DMA bus controller 26 as signal 832, which may be forwarded to the DRAM controller 32 as signal 834. The DRAM controller 32 may interpret signal 834 and send signal 836 to write the data read from a physical address of the memory 64 to the DRAM 38. A return signal 838 signifying the completion of the write to the DRAM 38 may be received by the DRAM controller 32, forwarded to the DMA bus controller 26 as signal 840, which may relay the signal to the DMA bus controller 54 as signal 842, which may relay the signal to the microcontroller 56 as signal 844.

Once the data read from the physical address of the memory 64 is written to the DRAM 38, the microcontroller 56 may send a notification to the CPU 24 that the requested read operation is complete and the data is available in the DRAM 38 by sending signal 846. The DMA bus controller 54 may receive the notification signal 846 and forward it to the DMA bus controller 26 as signal 848, which may be forwarded to the CPU 24 as signal 850.

Figure 9:
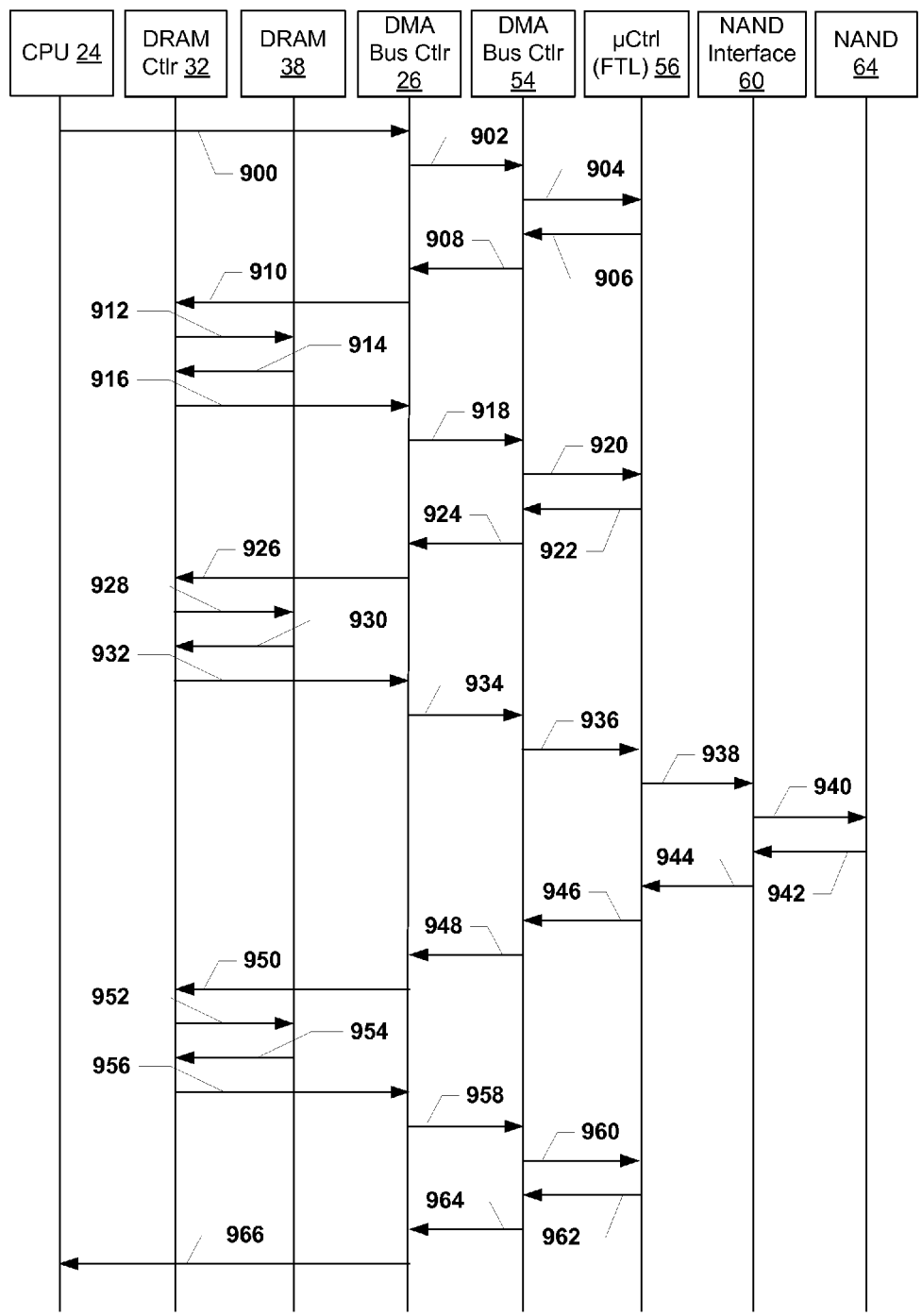
FIG. 9 is a process flow diagram illustrating an aspect method for executing a write operation with FTL host caching.

FIG. 9 illustrates an aspect of the process flow of the write to the flash memory device 50 operation 600. The CPU 24 may issue the write request for the logical address to the microcontroller 56, sending a signal 900 carrying the request through the DMA bus controller 26 as signal 902. The DMA controller 54 may receive signal 902 and forward it to the microcontroller 56 as signal 904.

Having been granted direct memory access to the DRAM 38 during the FTL host caching initialization, the microcontroller 56 may bus master the busses 34, 40, connecting it to the DRAM 38. The microcontroller may send signal 906 to retrieve/read the information associated with the logical address in the copy of the FTL tables 70 from the DRAM 38. The DMA bus controller 54 may forward signal 906 to the DMA bus controller 26 as signal 908, which may be forwarded to the DRAM controller 32 as signal 910. The DRAM controller 32 may interpret signal 910 and send signal 912 to the DRAM 38. The DRAM controller 32 may receive a return signal 914 from the DRAM 38, which may be sent to the DMA bus controller 26 as signal 916, forwarded to DMA bus controller 54 as signal 918, and finally received by the microcontroller 56 as signal 920. With the information retrieved from the copy of the FTL tables 70, the microcontroller 56 may now translate the logical address to the physical address of the flash memory 64.

Having received information regarding where to store the write data, the microcontroller 56 may retrieve the write data from the DRAM 38 by sending signal 922. The DMA bus controller 54 may receive signal 922 and forward it as signal 924 to the DMA bus controller 26. The DRAM controller 32 may receive the signal 926 from the DMA bus controller 26 and interpret it as signal 928 and send the signal 928 to the DRAM 38. The DRAM controller 32 may receive the write data read from the DRAM 38 as signal 930 and forward the write data to the microcontroller 56 as signal 932. The DMA bus controller 26 may receive the signal 932 and forward it as signal 934 to the DMA bus controller 54, which may be forwarded to the microcontroller 56 as signal 936.

Having determined the physical address and retrieved the write data, the microcontroller 56 may access and write data to memory 64 at the physical address by sending signal 938. The memory interface 60 may interpret the signal 938 and send signal 940 to the memory 64. The memory interface 60 may identify when the writing to the memory 64 is complete by receiving a return signal 942 from the memory 64, and send signal 944 to the microcontroller 56 to indicate the writing is complete.

Having been granted direct memory access to the DRAM 38 during the FTL host caching initialization, the microcontroller 56 may update the copy of the FTL tables 70 by bus mastering the busses 34, 40, connecting it to the DRAM 38. The microcontroller may send signal 946 to write directly to the DRAM 38. The DMA bus controller 54 may forward signal 946 to the DMA bus controller 26 as signal 948, which may be forwarded to the DRAM controller 32 as signal 950. The DRAM controller 32 may interpret signal 950 and send signal 952 to the DRAM 38. The DRAM controller 32 may identify when the update of the copy of the FTL tables 70 is complete by receiving a return signal 954 from the DRAM 38. The signal 954 may be sent to the DMA bus controller 26 as signal 956, forwarded to DMA bus controller 54 as signal 958, and finally received by the microcontroller 56 as signal 960.

After completing the update of the copy of the FTL tables 70, the microcontroller 56 may notify the CPU 24 that the operation 600 is complete by sending signal 962. The DMA bus controllers 54 may receive signal 962 and forward it to the DMA bus controller 26 as signal 964, which may be forwarded to the CPU 24 as signal 966.

Figure 10:
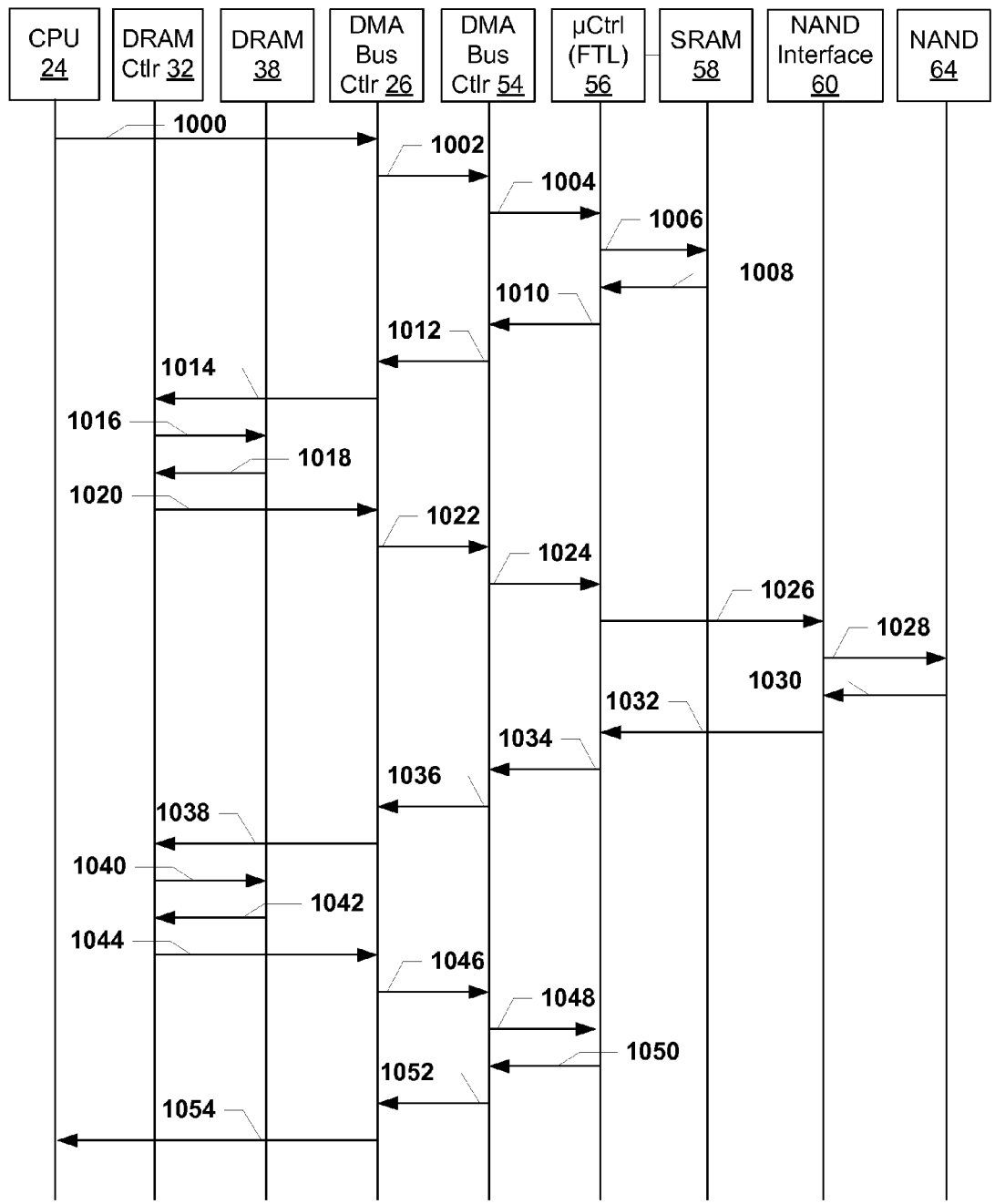
FIG. 10 is a process flow diagram illustrating an aspect method for executing a write operation with FTL host caching.

FIG. 10, illustrates an aspect of the process flow of the write to the flash memory device 50 operation 600. The CPU 24 may issue the write request for to the microcontroller 56, sending a signal 1000 carrying the request through the DMA bus controller 26 as signal 1002. The DMA controller 54 may receive signal 1002 and forward it to the microcontroller 56 as signal 1004.

Having received the write request, the microcontroller 56 may access the SRAM 58 of the flash memory device 50, by sending signal 1006, to retrieve/read information relating to the flash memory 64 concerning space suitable for storing the subject data of the write request. The information may include free storage space and/or wear leveling information for the flash memory 64. The microcontroller 56 may receive a return signal 1008 from the SRAM 58 representing the desired information. With this information, the microcontroller 56 may determine the physical address of the flash memory 64 for writing the data.

Having determined where to store the write data, the microcontroller 56 may retrieve the write data from the DRAM 38 by sending signal 1010. The DMA bus controller 54 may receive signal 1010 and forward it as signal 1012 to the DMA bus controller 26. The DRAM controller 32 may receive signal 1014 from the DMA bus controller 26 and interpret it as signal 1016 and send the signal 1016 to the DRAM 38. The DRAM controller 32 may receive the write data read from the DRAM 38 as signal 1018 and forward the write data to the microcontroller 56 as signal 1012. The DMA bus controller 26 may receive the signal 1020 and forward it as signal 1022 to the DMA bus controller 54, which may be forwarded to the microcontroller 56 as signal 1024.

Having determined the physical address and retrieved the write data, the microcontroller 56 may access the memory 64 write data to memory 64 at the physical address by sending signal 1026. The memory interface 60 may interpret the signal 1026 and send signal 1028 to the memory 64. The memory interface 60 may identify when the writing to the memory 64 is complete by receiving a return signal 1030 from the memory 64, and send signal 1032 to the microcontroller 56 to indicate the writing is complete.

Having been granted direct memory access to the DRAM 38 during the FTL host caching initialization, the microcontroller 56 may update the copy of the FTL tables 70 by bus mastering the busses 34, 40, connecting it to the DRAM 38. The microcontroller may send signal 1034 to write directly to the DRAM 38. The DMA bus controller 54 may forward signal 1034 to the DMA bus controller 26 as signal 1036, which may be forwarded to the DRAM controller 32 as signal 1038. The DRAM controller 32 may interpret signal 1038 and send signal 1040 to the DRAM 38. The DRAM controller 32 may identify when the update of the copy of the FTL tables 70 is complete by receiving a return signal 1042 from the DRAM 38. The signal 1042 may be sent to the DMA bus controller 26 as signal 1044, forwarded to DMA bus controller 54 as signal 1046, and finally received by the microcontroller 56 as signal 1048.

After completing the update of the copy of the FTL tables 70, the microcontroller 56 may notify the CPU 24 that the operation 600 is complete by sending signal 1050. The DMA bus controllers 54 may receive signal 1050 and forward it to the DMA bus controller 26 as signal 1052, which may be forwarded to the CPU 24 as signal 1054.

In some aspects, any portion of the process flow between any of the components may be repeated more than shown in FIGS. 7-10 for one of more of the processes described herein. For example, signals 734-758, representing copying the FTL tables 68 from the flash memory device 50 to the host device, may occur numerous times as transactions of the copying. The transactions may be executions of the copying where each transaction copies a portion of the FTL tables 68, and the transactions continue until the copying is complete. Taking an example of 32 MB of FTL table data, only 32, 64, or 128 bytes of FTL table data may be copied to the host device 20 per transaction. The same holds true for any read or write operation depicted in FIGS. 7-10.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for increasing performance of a flash translation layer (FTL) of a flash memory device, comprising:
storing a copy of an FTL table of the flash memory device on a volatile memory of a host device by the flash memory device, wherein the flash memory device and the host device comprise separately housed devices and are communicatively connectable via a communication bus;
receiving access to the copy of the FTL table stored in the volatile memory of the host device, by the flash memory device;
bus mastering, by the flash memory device, the communication bus that communicatively connects the flash memory device and the volatile memory of the host device;
accessing, by the flash memory device via the bus mastered communication bus, the copy of the FTL table of the flash memory device stored in the volatile memory of the host device as part of at least one of a read operation and a write operation:
retrieving the copy of the FTL from the volatile memory of the host device by the flash memory device; and
dynamically updating, by the flash memory device, the FTL of the flash memory device with changes to the copy of the FTL table of the flash memory device stored in the volatile memory.

2. The method of claim 1, further comprising:
receiving a query for a size of the FTL table from the host device in the flash memory device;
returning the size of the FTL table from the flash memory device to the host device;
receiving the size of the FTL table from the flash memory device at the host device; and
determining, by the host device, whether the volatile memory of the host device can store all of the FTL table.

3. The method of claim 2, further comprising:
subdividing the volatile memory of the host device, by the host device, wherein a size of a subdivision is based on the size of the FTL table;
receiving, by the flash memory device, direct memory access read privileges to the subdivision of the volatile memory of the host device where the copy of the FTL table is stored; and
receiving, by the flash memory device, direct memory access write privileges for the subdivision of the volatile memory of the host device where the copy of the FTL table is stored,
wherein storing a copy of the FTL table comprises storing by the flash memory device, the copy of the FTL table in the subdivision of the volatile memory of the host device.

4. The method of claim 1, wherein accessing the copy of the FTL table comprises:
receiving in the flash memory device a read operation request for a logical address from the host device;
initiating the read operation by the flash memory device;
reading at least a portion of the copy of the FTL table by the flash memory device;
determining a physical address corresponding to the logical address by the flash memory device;
retrieving, by the flash memory device, data located at the physical address of a memory of the flash memory device; and
returning the data to the host device by the flash memory device.

5. The method of claim 1, wherein accessing the copy of the FTL table comprises:
receiving by the flash memory device a write operation request for a logical address from the host device;
initiating the write operation by the flash memory device;

writing data to a physical address of a memory of the flash memory device by the flash memory device;

writing to the copy of the FTL table, by the flash memory device, to update the copy of the FTL table to correspond with changes made to the memory of the flash memory device when the data was written; and sending a notification of completion of the write operation to the host device by the flash memory device.

6. The method of claim 5, further comprising:

reading at least a portion of the copy of the FTL table by the flash memory device; and determining the physical address corresponding to the logical address by the flash memory device.

7. The method of claim 5, further comprising:

reading an SRAM of the flash memory device by the flash memory device; and determining, by the flash memory device, the physical address indicating a location of free storage space in the memory of the flash memory device.

8. The method of claim 1, further comprising sending, by the flash memory device, a notification to the host device indicating completion of storing the copy of the FTL table in the volatile memory of the host device.

9. The method of claim 1, further comprising updating, by the flash memory device, the FTL table of the flash memory device with the copy of the FTL table based on a parameter selected from a group consisting of a schedule, available resources, and completion of a write operation.

10. The method of claim 1, further comprising determining, by the host device, whether the flash memory device supports host caching of a copy of the FTL table in the volatile memory of the host device.

11. The method of claim 1, further comprising receiving, in the host device, a notification of completion of storing the copy of the FTL table from the flash memory device.

12. A non-transitory processor-readable medium having stored thereon processor-executable software instructions configured to cause a system to increase performance of a flash translation layer (FTL) of a flash memory device of the system by performing operations comprising:

storing a copy of an FTL table of the flash memory device on a volatile memory of a host device by the flash memory device, wherein the flash memory device and the host device comprise separately housed devices and are communicatively connectable via a communication bus;

receiving access to the copy of the FTL table stored in the volatile memory of the host device, by the flash memory device;

bus mastering, by the flash memory device, the communication bus that communicatively connects the flash memory device and the volatile memory of the host device;

accessing, by the flash memory device via the bus mastered communication bus, the copy of the FTL table of the flash memory device stored in the volatile memory of the host device as part of at least one of a read operation and a write operation;

retrieving the copy of the FTL from the volatile memory of the host device by the flash memory device; and dynamically updating, by the flash memory device, the FTL of the flash memory device with changes to the copy of the FTL table of the flash memory device stored in the volatile memory.

13. The non-transitory processor-readable medium of claim 12, wherein the stored processor-executable software instructions are configured to cause the system to perform operations further comprising:

receiving a query for a size of the FTL table from the host device in the flash memory device;

returning the size of the FTL table from the flash memory device to the host device;

receiving the size of the FTL table from the flash memory device at the host device; and determining, by the host device, whether the volatile memory of the host device can store all of the FTL table.

14. The non-transitory processor-readable medium of claim 13, wherein the stored processor-executable software instructions are configured to cause the system to perform operations further comprising:

subdividing the volatile memory of the host device, by the host device, wherein a size of a subdivision is based on the size of the FTL table;

receiving, by the flash memory device, direct memory access read privileges to the subdivision of the volatile memory of the host device where the copy of the FTL table is stored; and receiving, by the flash memory device, direct memory access write privileges for the subdivision of the volatile memory of the host device where the copy of the FTL table is stored, wherein storing a copy of the FTL table comprises storing by the flash memory device, the copy of the FTL table in the subdivision of the volatile memory of the host device.

15. The non-transitory processor-readable medium of claim 12, wherein the stored processor-executable software instructions are configured to cause the system to perform operations such that accessing the copy of the FTL table comprises:

receiving in the flash memory device a read operation request for a logical address from the host device;

initiating the read operation by the flash memory device;

reading at least a portion of the copy of the FTL table by the flash memory device;

determining a physical address corresponding to the logical address by the flash memory device;

retrieving, by the flash memory device, data located at the physical address of a memory of the flash memory device; and returning the data to the host device by the flash memory device.

16. The non-transitory processor-readable medium of claim 12, wherein the stored processor-executable software instructions are configured to cause the system to perform operations such that accessing the copy of the FTL table comprises:

receiving by the flash memory device a write operation request for a logical address from the host device;

initiating the write operation by the flash memory device;

writing data to a physical address of a memory of the flash memory device by the flash memory device;

writing to the copy of the FTL table, by the flash memory device, to update the copy of the FTL table to correspond with changes made to the memory of the flash memory device when the data was written; and sending a notification of completion of the write operation to the host device by the flash memory device.

17. The non-transitory processor-readable medium of claim 16, wherein the stored processor-executable software instructions are configured to cause the system to perform operations further comprising:

reading at least a portion of the copy of the FTL table by the flash memory device; and
determining the physical address corresponding to the logical address by the flash memory device.

18. The non-transitory processor-readable medium of claim 16, wherein the stored processor-executable software instructions are configured to cause the system to perform operations further comprising:
reading an SRAM of the flash memory device by the flash memory device; and
determining, by the flash memory device, the physical address indicating a location of free storage space in the memory of the flash memory device.

19. The non-transitory processor-readable medium of claim 12, wherein the stored processor-executable software instructions are configured to cause the system to perform operations further comprising sending, by the flash memory device, a notification to the host device indicating completion of storing the copy of the FTL table in the volatile memory of the host device.

20. The non-transitory processor-readable medium of claim 12, wherein the stored processor-executable software instructions are configured to cause the system to perform operations further comprising updating, by the flash memory device, the FTL table of the flash memory device with the copy of the FTL table based on a parameter selected from a group consisting of a schedule, available resources, and completion of the write operation.

21. The non-transitory processor-readable medium of claim 12, wherein the stored processor-executable software instructions are configured to cause the system to perform operations further comprising determining, by the host device, whether the flash memory device supports host caching of a copy of the FTL table in the volatile memory of the host device.

22. The non-transitory processor-readable medium of claim 12, wherein the stored processor-executable software instructions are configured to cause the system to perform operations further comprising receiving, in the host device, a notification of completion of storing the copy of the FTL table from the flash memory device.

23. A system, comprising:
a host device comprising:
a first housing;
a volatile memory; and
a first processor coupled to the volatile memory; and
a flash memory device coupled to the host device via a communication bus, the flash memory device comprising:
a second housing;
a flash memory configured to store a flash translation layer (FTL) table for use in translating between a logical address and a physical address; and
a second processor coupled to the flash memory, wherein the second processor is configured with processor-executable instructions to perform operations comprising:
storing a copy of the FTL table of the flash memory device in the volatile memory of the host device;
receiving access to the copy of the FTL table stored in the volatile memory of the host device;
bus mastering the communication bus;
accessing, via the bus mastered communication bus, the copy of the FTL table of the flash memory device stored in the volatile memory of the host device as part of at least one of a read operation and a write operation;
retrieving the copy of the FTL from the volatile memory of the host device by the flash memory device; and
dynamically updating, by the flash memory device, the FTL of the flash memory device with changes to the copy of the FTL table of the flash memory device stored in the volatile memory.

24. The system of claim 23, wherein:
the second processor is configured with processor-executable instructions to perform operations further comprising:
receiving a query for a size of the FTL table from the host device in the flash memory device; and
returning the size of the FTL table from the flash memory device to the host device; and
the first processor is configured with processor-executable instructions to perform operations further comprising:
receiving the size of the FTL table from the flash memory device at the host device; and
determining, by the host device, whether the volatile memory of the host device can store all of the FTL table.

25. The system of claim 24, wherein:
the first processor is configured with processor-executable instructions to perform operations further comprising:
subdividing the volatile memory of the host device, by the host device, wherein a size of a subdivision is based on the size of the FTL table;
storing the copy of the FTL table comprises storing by the flash memory device, the copy of the FTL table in the subdivision of the volatile memory of the host device; and
the second processor is configured with processor-executable instructions to perform operations further comprising:
receiving, by the flash memory device, direct memory access read privileges to the subdivision of the volatile memory of the host device where the copy of the FTL table is stored; and
receiving, by the flash memory device, direct memory access write privileges for the subdivision of the volatile memory of the host device where the copy of the FTL table is stored.

26. The system of claim 23, wherein the second processor is configured with processor-executable instructions such that accessing the copy of the FTL table comprises:
receiving in the flash memory device a read operation request for the logical address from the host device;
initiating the read operation by the flash memory device;
reading at least a portion of the copy of the FTL table by the flash memory device;
determining the physical address corresponding to the logical address by the flash memory device;
retrieving, by the flash memory device, data located at the physical address of the flash memory of the flash memory device; and
returning the data to the host device by the flash memory device.

27. The system of claim 23, wherein the second processor is configured with processor-executable instructions such that accessing the copy of the FTL table comprises:
receiving by the flash memory device a write operation request for the logical address from the host device;
initiating the write operation by the flash memory device;
writing data to the physical address of the flash memory of the flash memory device by the flash memory device;

writing to the copy of the FTL table, by the flash memory device, to update the copy of the FTL table to correspond with changes made to the flash memory of the flash memory device when the data was written; and sending a notification of completion of the write operation to the host device by the flash memory device.

28. The system of claim 27, wherein the second processor is configured with processor-executable instructions to perform operations further comprising:

reading at least a portion of the copy of the FTL table by the flash memory device; and determining the physical address corresponding to the logical address by the flash memory device.

29. The system of claim 27, wherein:

the flash memory device further comprises an SRAM coupled to the second processor; and the second processor is configured with processor-executable instructions to perform operations further comprising:

reading the SRAM of the flash memory device by the flash memory device; and determining, by the flash memory device, the physical address indicating a location of free storage space in the flash memory of the flash memory device.

30. The system of claim 23, wherein the second processor is configured with processor-executable instructions to perform operations further comprising sending, by the flash memory device, a notification to the host device indicating completion of storing the copy of the FTL table in the volatile memory of the host device.

31. The system of claim 23, wherein the second processor is configured with processor-executable instructions to perform operations further comprising updating, by the flash memory device, the FTL table of the flash memory device with the copy of the FTL table based on a parameter selected from a group consisting of a schedule, available resources, and completion of the write operation.

32. The system of claim 23, wherein the first processor is configured with processor-executable instructions to perform operations further comprising determining, by the host device, whether the flash memory device supports host caching of a copy of the FTL table in the volatile memory of the host device.

33. The system of claim 23, wherein the first processor is configured with processor-executable instructions to perform operations further comprising receiving, in the host device, a notification of completion of storing the copy of the FTL table from the flash memory device.

34. A system, comprising:

a flash memory device, wherein the flash memory device and a host device comprise separately housed devices;

means for communicatively connecting the flash memory device and the host device;

means for storing a copy of a flash translation layer (FTL) table of the flash memory device on a volatile memory of the host device by the flash memory device;

means for receiving access to the copy of the FTL table stored in the volatile memory of the host device by the flash memory device;

means for bus mastering, by the flash memory device, the means for communicatively connecting the flash memory device and the volatile memory of the host device;

means for accessing, by the flash memory device via the bus mastered means for communicatively connecting the flash memory device and the volatile memory of the host device, the copy of the FTL table of the flash memory device stored in the volatile memory of the host device as part of at least one of a read operation and a write operation;

means for retrieving the copy of the FTL from the volatile memory of the host device by the flash memory device; and means for dynamically updating, by the flash memory device, the FTL of the flash memory device with changes to the copy of the FTL table of the flash memory device stored in the volatile memory.

35. The system of claim 34, further comprising:

means for receiving a query for a size of the FTL table from the host device in the flash memory device;

means for returning the size of the FTL table from the flash memory device to the host device;

means for receiving the size of the FTL table from the flash memory device at the host device; and means for determining, by the host device, whether the volatile memory of the host device can store all of the FTL table.

36. The system of claim 35, further comprising:

means for subdividing the volatile memory of the host device, by the host device, wherein a size of a subdivision is based on the size of the FTL table;

means for receiving, by the flash memory device, direct memory access read privileges to the subdivision of the volatile memory of the host device where the copy of the FTL table is stored; and means for receiving, by the flash memory device, direct memory access write privileges for the subdivision of the volatile memory of the host device where the copy of the FTL table is stored, wherein means for storing a copy of the FTL table comprises means for storing by the flash memory device, the copy of the FTL table in the subdivision of the volatile memory of the host device.

37. The system of claim 34, wherein means for accessing the copy of the FTL table comprises:

means for receiving in the flash memory device a read operation request for a logical address from the host device;

means for initiating the read operation by the flash memory device;

means for reading at least a portion of the copy of the FTL table by the flash memory device;

means for determining a physical address corresponding to the logical address by the flash memory device;

means for retrieving, by the flash memory device, data located at the physical address of a memory of the flash memory device; and means for returning the data to the host device by the flash memory device.

38. The system of claim 34, wherein means for accessing the copy of the FTL table further comprises:

means for receiving by the flash memory device a write operation request for a logical address from the host device;

means for initiating the write operation by the flash memory device;

means for writing data to a physical address of a memory of the flash memory device by the flash memory device;

means for writing to the copy of the FTL table, by the flash memory device, to update the copy of the FTL table to correspond with changes made to the memory of the flash memory device when the data was written; and means for sending a notification of completion of the write operation to the host device by the flash memory device.

39. The system of claim 38, further comprising:
means for reading at least a portion of the copy of the FTL table by the flash memory device; and
means for determining the physical address corresponding to the logical address by the flash memory device.

40. The system of claim 38, further comprising:
means for reading an SRAM of the flash memory device by the flash memory device; and
means for determining, by the flash memory device, the physical address indicating a location of free storage space in the memory of the flash memory device.

41. The system of claim 34, further comprising means for sending, by the flash memory device, a notification to the host device indicating completion of storing the copy of the FTL table in the volatile memory of the host device.

42. The system of claim 34, further comprising means for updating, by the flash memory device, the FTL table of the flash memory device with the copy of the FTL table based on a parameter selected from a group consisting of a schedule, available resources, and completion of a write operation.

43. The system of claim 34, further comprising means for determining, by the host device, whether the flash memory device supports host caching of a copy of the FTL table in the volatile memory of the host device.

44. The system of claim 34, further comprising means for receiving, in the host device, a notification of completion of storing the copy of the FTL table from the flash memory device.

45. A flash memory device configured to couple to a separately housed host device via a communication bus, the flash memory device comprising:
a flash memory configured to store data including a flash translation layer (FTL) table for use in translating between a logical address and a physical address; and
a processor coupled to the flash memory, wherein the processor is configured with processor-executable instructions to perform operations comprising:
storing a copy of a flash translation layer FTL table of the flash memory device in a volatile memory of the host device;
receiving access to the copy of the FTL table stored in the volatile memory of the host device;
bus mastering the communication bus;
accessing, via the bus mastered communication bus, the copy of the FTL table of the flash memory device stored in the volatile memory of the host device as part of at least one of a read operation and a write operation;
retrieving the copy of the FTL from the volatile memory of the host device; and
dynamically updating the FTL of the flash memory device with changes to the copy of the FTL table of the flash memory device stored in the volatile memory.

46. The flash memory device of claim 45, wherein:
the processor is configured with processor-executable instructions to perform operations further comprising:
receiving a query for a size of the FTL table from the host device; and
returning the size of the FTL table to the host device; and
the processor is configured with processor-executable instructions to perform operations such that storing the copy of the FTL table of the flash memory device in a volatile memory of the host device comprises storing the copy of the FTL table in a subdivision of the volatile memory of the host device identified to the processor by the host device.

47. The flash memory device of claim 46, wherein the processor is configured with processor-executable instructions to perform operations further comprising:
receiving from the host device direct memory access read privileges to the subdivision of the volatile memory of the host device where the copy of the FTL table is stored; and
receiving from the host device direct memory access write privileges for the subdivision of the volatile memory of the host device where the copy of the FTL table is stored.

48. The flash memory device of claim 45, wherein the processor is configured with processor-executable instructions such that accessing the copy of the FTL table comprises:
reading from the volatile memory of the host device at least a portion of the copy of the FTL table in response to one of a read and a write operation request from the host device for the logical address;
returning to the host device data located at the physical address of the flash memory corresponding to the logical address in response to a read operation request;
writing to the copy of the FTL table stored in the volatile memory of the host device to update the copy of the FTL table to correspond with changes made to the flash memory when data is written to the physical address of the flash memory device corresponding to the logical address in response to a write operation request; and
sending, to the host device, a notification of completion of the write operation in response to the write operation request.

49. A flash memory device configured to couple to a separately housed host device via a communication bus, the flash memory device comprising:
means for storing a copy of a flash translation layer (FTL) table of the flash memory device in a volatile memory of the host device;
means for receiving access to the copy of the FTL table stored in the volatile memory of the host device;
means for bus mastering the communication bus that communicatively connects the flash memory device and the volatile memory of the host device;
means for accessing, via the bus mastered communication bus, the copy of the FTL table of the flash memory device stored in the volatile memory of the host device as part of at least one of a read operation and a write operation;
means for retrieving the copy of the FTL from the volatile memory of the host device; and
means for dynamically updating the FTL of the flash memory device with changes to the copy of the FTL table of the flash memory device stored in the volatile memory.

50. The flash memory device of claim 49, further comprising:
means for receiving a query for a size of the FTL table from the host device; and
means for returning the size of the FTL table to the host device,
wherein means for storing the copy of the FTL table of the flash memory device in a volatile memory of the host device comprises means for storing the copy of the FTL table in a subdivision of the volatile memory of the host device.

51. The flash memory device of claim 50, further comprising:
means for receiving from the host device direct memory access read privileges to the subdivision of the volatile memory of the host device where the copy of the FTL table is stored; and
means for receiving from the host device direct memory access write privileges for the subdivision of the volatile memory of the host device where the copy of the FTL table is stored.

52. The flash memory device of claim 49, wherein means for accessing the copy of the FTL table comprises:
means for reading from the volatile memory of the host device at least a portion of the copy of the FTL table in response to one of a read and a write operation request, from the host device, for a logical address;
means for returning to the host device data located at a physical address of a flash memory corresponding to the logical address in response to a read operation request;
means for writing to the copy of the FTL table stored in the volatile memory of the host device to update the copy of the FTL table to correspond with changes made to the flash memory when data is written to the physical address of the flash memory device corresponding to the logical address in response to a write operation request; and
means for sending, to the host device, a notification of completion of the write operation in response to the write operation request.

53. A host device configured to couple to a separately housed flash memory device, the host device comprising:
a volatile memory;
a communication bus communicatively connecting the volatile memory of the host device and configured to communicate to the flash memory device when coupled to the host device; and
a processor coupled to the volatile memory and the communication bus, wherein the processor is configured with processor-executable instructions to perform operations comprising:
determining whether the separately housed flash memory device supports host caching of a copy of a flash translation layer (FTL) table of the separately housed flash memory device in the volatile memory;
allocating a portion of the volatile memory for storing the copy of the FTL table in response to determining that the separately housed flash memory device supports host caching of a copy of the FTL table of the separately housed flash memory device in the volatile memory;
granting the flash memory device direct memory access read and write privileges for the portion of the volatile memory via the communication bus;
allowing access to the copy of the FTL from the volatile memory of the host device; and
providing changes to the copy of the FTL table for dynamically updating the FTL of the flash memory device.

54. The host device of claim 53, wherein the processor is configured with processor-executable instructions to perform operations further comprising:
querying the separately housed flash memory device for a size of the FTL table stored in the separately housed flash memory device; and
determining whether the volatile memory can store all of the FTL table,
wherein allocating the portion of the volatile memory comprises determining a size of the portion of the volatile memory based on the size of the FTL table.

55. A host device configured to couple to a separately housed flash memory device via a communication bus, the host device comprising:
means for determining whether the separately housed flash memory device supports host caching of a copy of a flash translation layer (FTL) table of the separately housed flash memory device in a volatile memory of the host device;
means for allocating a portion of the volatile memory for storing the copy of the FTL table in response to determining that the separately housed flash memory device supports host caching of a copy of the FTL table of the separately housed flash memory device in the volatile memory;
means for granting the separately housed flash memory device direct memory access read and write privileges for the portion of the volatile memory;
means for allowing access to the copy of the FTL from the volatile memory of the host device; and
means for providing changes to the copy of the FTL table for dynamically updating the FTL of the flash memory device.

56. The host device of claim 55, further comprising:
means for querying the separately housed flash memory device for a size of the FTL table stored in the separately housed flash memory device; and
means for determining whether the volatile memory can store all of the FTL table,
wherein means for allocating the portion of the volatile memory comprises means for determining a size of the portion of the volatile memory based on the size of the FTL table.

* * * * *